United States Patent

Mihara

[11] Patent Number: 6,091,910
[45] Date of Patent: Jul. 18, 2000

[54] FINDER FOR SINGLE-LENS REFLEX TYPE DIGITAL CAMERAS

[75] Inventor: Shinichi Mihara, Tama, Japan

[73] Assignee: Olympus Optical Co., Ltd., Tokyo, Japan

[21] Appl. No.: 09/255,715

[22] Filed: Feb. 23, 1999

[30] Foreign Application Priority Data

Feb. 24, 1998 [JP] Japan .................................. 10-042299

[51] Int. Cl.$^7$ ................................................ G03B 13/02
[52] U.S. Cl. ............................................ 396/373; 396/384
[58] Field of Search ..................................... 396/373, 384

[56] References Cited

U.S. PATENT DOCUMENTS

| | | | |
|---|---|---|---|
| 3,387,530 | 6/1968 | Ebertz | 396/384 |
| 3,421,407 | 1/1969 | Hiruma | 396/384 |
| 3,541,919 | 11/1970 | Weyrauch | 396/373 |
| 3,601,477 | 8/1971 | Miyazaki | 396/384 |
| 4,947,198 | 8/1990 | Inanobe et al. | 396/384 |
| 5,136,427 | 8/1992 | Sugawara . | |
| 5,206,675 | 4/1993 | Miyauchi et al. | 396/384 |
| 5,216,457 | 6/1993 | Yamaguchi et al. | 396/384 |
| 5,235,460 | 8/1993 | Abe | 396/384 |
| 5,313,327 | 5/1994 | Ito et al. | 396/373 |
| 5,740,485 | 4/1998 | Miyamoto et al. | 396/384 |
| 5,838,504 | 11/1998 | Ichikawa et al. | 396/384 |
| 5,864,436 | 1/1999 | Noyes | 396/373 |
| 5,903,788 | 5/1999 | Mukai et al. | 396/373 |

FOREIGN PATENT DOCUMENTS 6-109984  4/1994  Japan .

*Primary Examiner*—Russell Adams
*Attorney, Agent, or Firm*—Pillsbury Madison & Sutro LLP

[57] ABSTRACT

A finder for single-lens reflex type digital cameras includes a reflecting plane for splitting a light beam from an imaging optical system of a camera into two beams directed toward an image sensor and a finder system, a prism system for erecting an image, and an ocular optical system. The prism system has an entrance surface, a reflecting surface consisting of one plane, a reflecting surface of roof shape, and an exit surface. An optical path between the entrance surface and the reflecting surface consisting of one plane is practically perpendicular to an optical path between the reflecting surface of roof shape and the exit surface in the prism block.

18 Claims, 8 Drawing Sheets

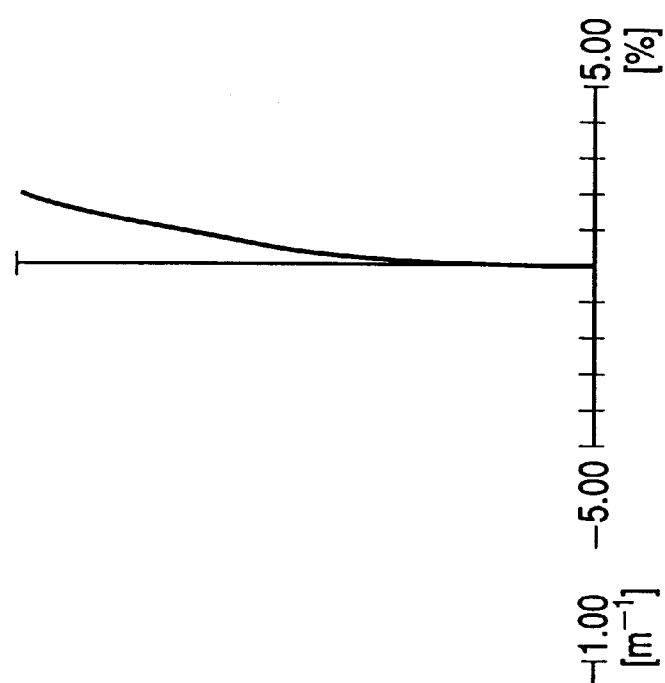

FINDER FOR SINGLE-LENS REFLEX TYPE DIGITAL CAMERAS

BACKGROUND OF THE INVENTION

1. Field of the Invention

This invention relates to a finder for single-lens reflex type digital cameras which uses an electronic image sensor such as a CCD.

2. Description of Related Art

In recent years, special attention has been devoted to a digital camera (electronic camera) as an alternative, used in the next generation, to a 35 mm silver halide film (usually called a Leica size) camera. The size of a CCD used as an image sensor in this digital camera varies in diagonal length from a fraction to the order of tenth of a 35 mm silver halide film. Thus, where a single-lens reflex system is applied to the camera of this type, it is necessary to increase the magnification of an ocular optical system used in a finder system. In doing so, the focal length of the finder system must be reduced as a matter of course. Furthermore, it is also necessary to interpose an image erecting optical system between the first imaging plane and the ocular optical system of the finder system.

However, the pupil diameter and the eyepoint position of the finder system must be constant, irrespective of the focal length of the ocular optical system of the finder system, and a sufficiently wide field angle must also be secured for a single-lens reflex camera. As such, an effective sectional area of the image erecting optical system tends to increase. In order to construct the image erecting optical system with a prism under such circumstances, its optical path length must be increased. This makes the power distribution of the ocular optical system very difficult and develops a tendency that aberrations affecting the view of the finder are considerably deteriorated.

Consequently, in order to solve the above problems, it is necessary to take account of a prism design prepared to have the shortest possible optical path length and the construction of an ocular optical system with a power distribution and a lens configuration which are advantageous for correction for aberrations.

SUMMARY OF THE INVENTION

It is, therefore, an object of the present invention to provide a finder for single-lens reflex type digital cameras which is equipped with an ocular optical system favorably corrected for aberrations and having a high magnification and a wide field angle.

In order to achieve this object, according to one aspect of the present invention, the finder for single-lens reflex type digital cameras is provided with a reflecting plane for splitting a light beam from an imaging optical system of a camera into two beams directed toward an image sensor and a finder system, and has a prism system for erecting an image and an ocular optical system which are arranged along a traveling direction of light in the finder system placed after the position of the image formed by the imaging optical system. The prism system for erecting the image includes, in order along the traveling direction of light in one prism block, an entrance surface, a reflecting surface consisting of one plane, a reflecting surface of roof shape, and an exit surface. An optical path between the entrance surface and the reflecting surface consisting of one plane is practically perpendicular to an optical path between the reflecting surface of roof shape and the exit surface in the prism block.

According to another aspect of the present invention, the finder is provided with a reflecting plane for splitting a light beam from an imaging optical system of a camera into two beams directed toward an image sensor and a finder system, and has a prism having of a first reflecting surface, a second reflecting surface, and a third reflecting surface and an ocular optical system which are arranged along a traveling direction of light in the finder system placed after the position of the image formed by the imaging optical system. The normal lines of the first and second reflecting surfaces are included in the same plane. This plane is practically perpendicular to the optical axis of the imaging optical system, and the normal line of the first reflecting surface is practically perpendicular to that of the second reflecting surface. The third reflecting surface reflects an axial light beam from the imaging optical system so as to be practically parallel with the optical axis of the imaging optical system. The ocular optical system includes, in order from the object side, a biconvex lens whose object-side surface has a larger curvature than in its pupil-side surface and a biconcave lens whose pupil-side surface has a larger curvature than in its object-side surface. The finder also satisfies the following conditions:

$$1 < l_2/l_1 < 1.4$$

$$0.8 < L/(np\ fE) < 1.6$$

where $l_1$ is an axial distance from the first reflecting surface to the second reflecting surface of the prism, $l_2$ is an axial distance from the second reflecting surface to the third reflecting surface of the prism, L is an axial distance from the entrance surface to the exit surface of the prism, np is the refractive index of the medium of the prism, and fE is the combined focal length of the finder system on the pupil side of the position of the image formed by the imaging optical system.

According to still another aspect of the present invention, the finder is provided with a reflecting plane for splitting a light beam from an imaging optical system of a camera into two beams directed toward an image sensor and a finder system, and has a prism system for erecting an image and an ocular optical system which are arranged along a traveling direction of light in the finder system placed after the position of the image formed by the imaging optical system. The ocular optical system includes, in order from the object side, a positive lens directing a convex surface with relatively large curvature toward the object side and a negative lens directing a concave surface with relatively large curvature toward the pupil side. The finder also satisfies the following conditions:

$$-6 < (R_{31}+R_{32})/(R_{31}-R_{32}) < -0.1$$

$$0.1 < (R_{33}+R_{34})/(R_{33}-R_{34}) < 15$$

where $R_{31}$ and $R_{32}$ are radii of curvature of the surfaces on the object and pupil sides, respectively, of the positive lens and $R_{33}$ and $R_{34}$ are radii of curvature of the surfaces on the object and pupil sides, respectively, of the negative lens.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 8A, 8B, and 8C are views showing aberration curves in the finder of the second embodiment.

DETAILED DESCRIPTION OF THE PREFERRED EMBODIMENTS

Figure 1:
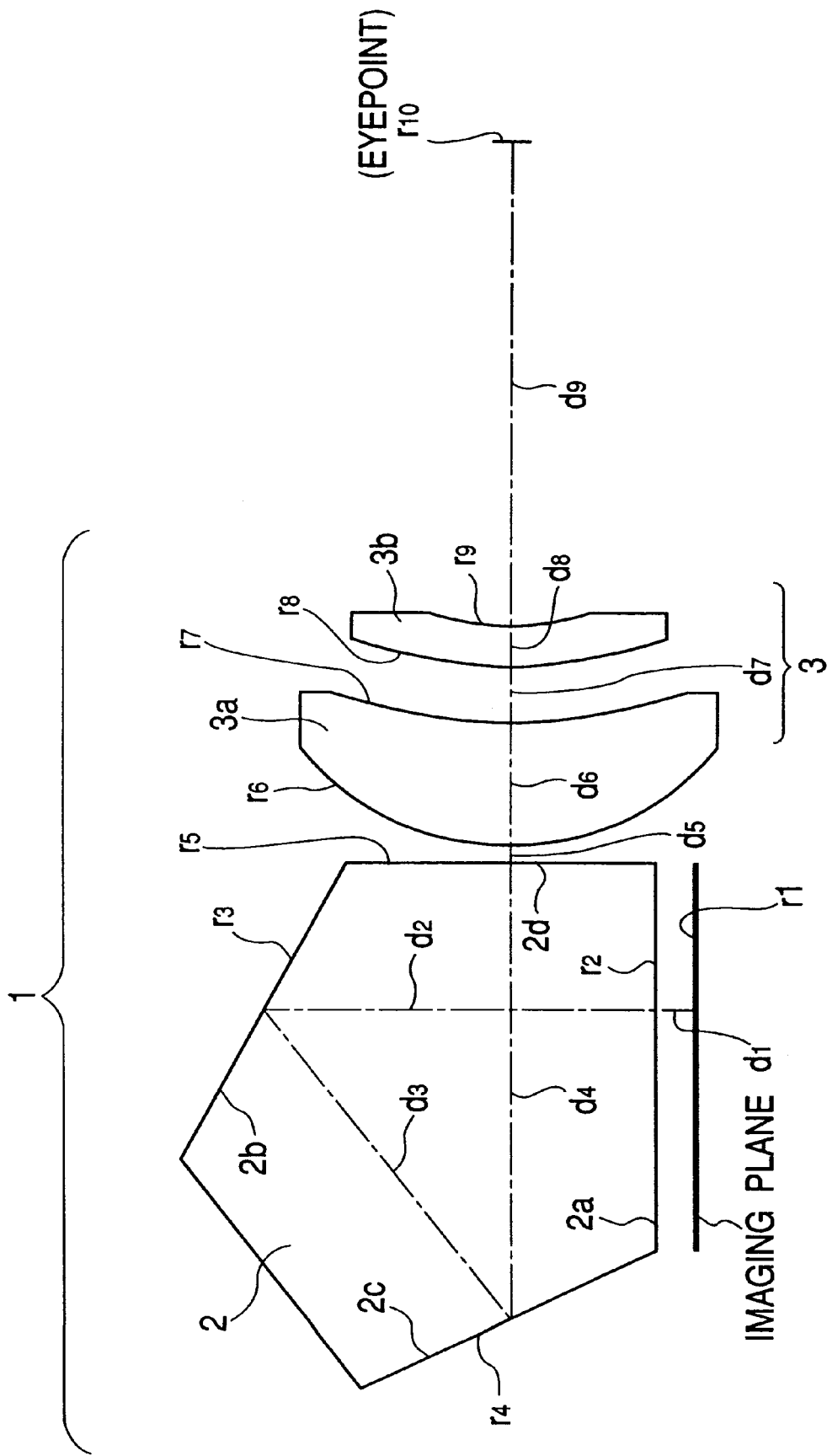
FIG. 1 is sectional view, developed along the optical axis, showing the arrangement of the finder of a first embodiment.

The finder of the present invention is mounted to the single-lens reflex type digital camera and can be constructed with a roof prism or a Porro prism. What follows is a description of the case where either prism is used.

Where the roof prism is used, an ocular optical system with high magnification is reduced in focal length. Thus, when such an ocular optical system is used to construct the finder, the optical path length of an image erecting optical system must also be reduced. Consider now an effective sectional area of the prism to be decreased in the image erecting optical system in order to reduce the optical path length of the image erecting optical system.

When a so-called pentaprism which has been widely used as the image erecting optical system in a single-lens reflex camera is employed to construct the finder, it is conceivable to diminish the size of the pentaprism in accordance with the focal length of the ocular optical system used together. Even though this has been done, a distance from the position of an observer's pupil or the ocular optical system to the pentaprism is constant, irrespective of the focal length of the ocular optical system, and thus the sectional area on the exit surface side of the pentaprism is insufficient as a matter of course.

The smallness of the sectional area on the exit surface side of the pentaprism is attributable to the fact that its cross section assumes a roof shape (the shape of an isosceles triangle). The sectional area on the entrance surface side of the pentaprism may be relatively small because it is governed by the size of an imaging plane. In addition, the sectional area on the entrance surface side is not restricted by the roof shape. As such, in the present invention, the pentaprism of the single-lens reflex camera of Leica size is constructed so that the entrance surface side and the exit surface side of the pentaprism mentioned above are reversed. By doing so, the size of the effective sectional area of the pentaprism is maintained, and at the same time, the compactness of the entire finder is achieved.

Specifically, the finder of the present invention is provided with a reflecting plane for splitting a light beam from an imaging optical system of a camera into two beams directed toward an image sensor and a finder system, and has a pentaprism (an image erecting optical system) and an ocular optical system which are arranged along a traveling direction of light in the finder system placed after the position of the image formed by the imaging optical system. The pentaprism includes, in order along the traveling direction of light in one prism block, an entrance surface, a reflecting surface consisting of one plane, a reflecting surface of roof shape, and an exit surface. An optical path between the entrance surface and the reflecting surface consisting of one plane is practically perpendicular to an optical path between the reflecting surface of roof shape and the exit surface in the prism block.

In this case, it is necessary to satisfy the following conditions:

$$0.8 < L/(np\, fE) < 1.6 \qquad (1)$$

$$0.8 < L_2/L_1 < 2.0 \qquad (2)$$

$$20 < \theta_1 < 35 \qquad (3)$$

where L is an axial distance from the entrance surface to the exit surface of the prism, np is the refractive index of the medium of the prism, fE is the combined focal length of the finder system on the pupil side of the position of the image formed by the imaging optical system, $L_1$ is an axial distance from the entrance surface to the reflecting surface consisting of one plane, of the pentaprism, $L_2$ is an axial distance from the reflecting surface of roof shape to the exit surface of the pentaprism, and $\theta_1$ is an angle made by an optical axis from the entrance surface to the reflecting surface consisting of one plane, of the pentaprism with the normal line of the reflecting surface consisting of one plane.

Condition (1) defines the optical path length of the pentaprism. If the value of L/(np fE) exceeds the upper limit of Condition (1), it is difficult to construct an ocular optical system with high magnification. If, on the other hand, the value of L/(np fE) is below the lower limit of the Condition (1), it is difficult to construct the pentaprism.

Conditions (2) and (3) refer to conditions for optimizing the shape of the prism. If these conditions are not met, even though Condition (1) is satisfied, principal rays will be eclipsed to cause a shade on the periphery of a finder image or ghost will be liable to occur, which is unfavorable.

Where the Porro prism is used as the image erecting optical system, on the other hand, it is desirable that the Porro prism is constructed as described below, in view of the mounting spaces of an electronic image sensor and a circuit board which are mounted in the camera and the layout of optical elements.

The finder is provided with a reflecting plane for splitting a light beam from the imaging optical system of the camera into two beams directed toward an image sensor and a finder system, and has a prism having a first reflecting surface, a second reflecting surface, and a third reflecting surface and an ocular optical system which are arranged along a traveling direction of light In the finder system placed after the position of the image formed by the imaging optical system. The normal lines of the first and second reflecting surfaces are included in the same plane. This plane is practically perpendicular to the optical axis of the imaging optical system, and the normal line of the first reflecting surface is substantially perpendicular to that of the second reflecting surface. The third reflecting surface reflects an axial light beam from the imaging optical system so as to be substantially parallel with the optical axis of the imaging optical system.

In the digital camera, the circuit board is mounted closer to an observer's eye than to the electronic image sensor, and thus some space is required. Furthermore, a prism used in the camera of this type is such that restrictions on its design and space vary very greatly, depending on the aspect ratio of a finder field. For most of the digital cameras, such aspect ratios range from 0.72 (in a rectangle) to 1 (in a square). Thus, in order to hold an eyepoint at a proper position in the assembly of the camera, the finder of the present invention is constructed as mentioned above, so that it is avoidable that the light is bent at a plane corresponding to the first reflecting surface to be parallel to the optical axis of the imaging optical system and to travel toward the object side. In addition, a condition for designing the prism in this case is as follows:

$$1 < l_2/l_1 < 1.4 \quad (4)$$

where $l_1$ is an axial distance from the first reflecting surface to the second reflecting surface of the prism, $l_2$ is an axial distance from the second reflecting surface to the third reflecting surface of the prism.

Here, if the value of $l_2/l_1$ passes the upper limit of Condition (4), an effective portion of the third reflecting surface of the prism becomes liable to interfere with an effective portion of the reflecting plane for splitting the light beam from the imaging optical system in the vicinity of the third reflecting surface, and thus it is difficult to construct the prism. If, on the other hand, the value of $l_2/l_1$ is below the lower limit of Condition (4), the effective portions of the second and third reflecting surfaces becomes liable to interfere with each other, and thus it is also difficult to construct the prism.

Hence, the finder of the present invention further satisfies Condition (1) even in the case where the Porro prism is used, thereby obviating the above defect.

Moreover, in the finder of the present invention, the power distribution of the ocular optical system is taken into account and thereby a proper optical path length of the prism system for erecting an image is ensured. Specifically, the principal point of the ocular optical system is located on the object side of a surface, closest to the object side, of lenses constituting the ocular optical system. It is good practice that this ocular optical system is constructed with: (a) a single positive meniscus lens whose convex surface is directed toward the object side or (b) a positive lens and a negative lens which are arranged in this order from the object side. Case (a) is favorable because its placement constitutes a so-called landscape type from a relation with a pupil position. In Case (b), where the two lenses are fixedly used or they are integrally moved along the optical axis to thereby make a diopter adjustment, an arrangement such that the negative lens is shaped into a meniscus lens whose concave surface is directed toward the pupil side is advantageous for paraxial rays and for correction for aberrations (notably spherical aberration) as well.

Also, it becomes necessary for the ocular optical system constructed as mentioned above to satisfy the following conditions:

$$-6 < (R_{31} + R_{32})/(R_{31} - R_{32}) < -0.1 \quad (5)$$

$$0.1 < (R_{33} + R_{34})/(R_{33} - R_{34}) < 15 \quad (6)$$

where $R_{31}$ and $R_{32}$ are radii of curvature of the surfaces on the object and pupil sides, respectively, of the positive lens of the ocular optical system and $R_{33}$ and $R_{34}$ are radii of curvature of the surfaces on the object and pupil sides, respectively, of the negative lens of the ocular optical system.

Conditions (5) and (6) define the shapes of the lenses constituting the ocular optical system. If the values of $(R_{31}+R_{32})/(R_{31}-R_{32})$ and $(R_{33}+R_{34})/(R_{33}-R_{34})$ are outside the lower limits of Conditions (5) and (6), respectively, an ocular optical system with high magnification cannot be constructed. Beyond the upper limit, it becomes difficult to favorably correct astigmatism and spherical aberration, and the view of the finder will be impaired.

In the ocular optical system, where either the positive lens or the negative lens is moved along the optical axis to make the diopter adjustment, one surface of either lens is configured to be aspherical or the following condition is satisfied, and thereby the fluctuation of astigmatism produced by the diopter adjustment can be controlled.

$$-1.2 < (fE/R_{32}) - (fE/R_{33}) < 1.2 \quad (7)$$

If the value of $(fE/R_{32}) - (fE/R_{33})$ is outside the limits defined by Condition (7), the fluctuation of astigmatism due to the diopter adjustment becomes prominent.

Furthermore, in the present invention, when the exit surface of the prism system for erecting the image is shaped into a curved surface which is convex toward the pupil side, the principal point of the entire ocular optical system can be easily shifted to the object side. The powers of individual optical elements can also be distributed, which is advantageous for correction for aberrations. In this case, it is desirable that the prism system for erecting the image satisfies the following condition:

$$-20 < RP/fE < -0.7 \quad (8)$$

where RP is the radius of curvature of the exit surface of the prism system for erecting the image. If the value of RP/fE passes the upper limit of Condition (8), this will bring about little effect on correction for aberrations. If, on the other hand, the value is below the lower limit, the power of the entire ocular optical system will be too much shifted toward the prism side, and thus correction for aberrations becomes difficult. This is unfavorable.

The ocular optical system, which satisfies Conditions (5)–(8), is used together with the prism system for erecting the image which includes the roof prism or the Porro prism, thereby bringing about a further effect.

Where the Porro prism is used in the finder of the present invention, it is desirable that the reflecting plane for splitting the light beam into two beams directed toward the image sensor and the finder system is constructed with a half mirror. This is because the half mirror reflects the light beam toward the image sensor and transmits it toward the finder system and thereby another reflecting surface can be provided between the half mirror and the imaging plane of the imaging optical system in the finder system to facilitate the layout of the image sensor and the circuit board as well as the design of a camera body.

When the longitudinal and lateral dimensions of the finder field are represented by H and V, respectively, the finder of the present invention satisfies the following condition:

$$0.72 < H/V < 1 \quad (9)$$

In the present invention, as mentioned above, the finder satisfies Conditions (1)–(3) and (5)–(9) when using the pentaprism and Conditions (1) and (4)–(9) when using the Porro prism. In this way, excellent performance is achived.

The finder of the present invention brings about an improvement when Conditions (1)–(8) are replaced by the following conditions:

$$0.9 < L/(np\ fE) < 1.4 \quad (1')$$

$$0.9 < L_2/L_1 < 1.7 \quad (2')$$

$$22 < \theta_1 < 33 \quad (3')$$

$$1 < l_2/l_1 < 1.3 \quad (4')$$

$$-5 < (R_{31} + R_{32})/(R_{31} - R_{32}) < -0.2 \quad (5')$$

$$0.4 < (R_{33} + R_{34})/(R_{33} - R_{34}) < 12 \quad (6')$$

$$-1.0 < (fE/R_{32}) - (fE/R_{33}) < 1.0 \quad (7')$$

$$-15 < RP/fE < -1 \quad (8')$$

Also, the finder of the present invention is further improved when Conditions (1')–(8') are further replaced by the following conditions:

$$1.0 < L/(np\ fE) < 1.2 \quad (1'')$$

$$1.0 < L_2/L_1 < 1.5 \quad (2'')$$

$$24 < \theta_1 < 32 \quad (3'')$$

$$1 < l_2/l_1 < 1.2 \quad (4'')$$

$$-4 < (R_{31} + R_{32})/(R_{31} - R_{32}) < -0.3 \quad (5'')$$

$$0.7 < (R_{33} + R_{34})/(R_{33} - R_{34}) < 10 \quad (6'')$$

$$-0.8 < (fE/R_{32}) - (fE/R_{33}) < 0.8 \quad (7'')$$

$$-10 < RP/fE < -1 \quad (8'')$$

The embodiments of the present invention will be described below.

First Embodiment

In FIG. 1, a finder 1 in this embodiment includes, in order from the object side, a pentaprism 2 and an ocular optical system 3. The pentaprism 2 has an entrance surface 2a, a reflecting surface 2b, a roof surface (reflecting surface) 2c, and an exit surface 2d. The reflecting surface 2b consists of one plane. The ocular optical system 3 includes, in order from the side of the pentaprism 2, a positive lens 3a and a negative lens 3b. The positive lens 3a is disposed so that its convex side with relatively large curvature faces the pentaprism 2. The negative lens 3b is placed so that its concave side with relatively large curvature faces the pupil.

In the pentaprism 2, an optical path from the entrance surface 2a to the reflecting surface 2b is nearly perpendicular to an optical path from the roof surface 2c to the exit surface 2d. The ocular optical system 3 is designed so that the positive lens 3a and the negative lens 3b can be moved along the optical axis for diopter adjustment.

Figure 2:
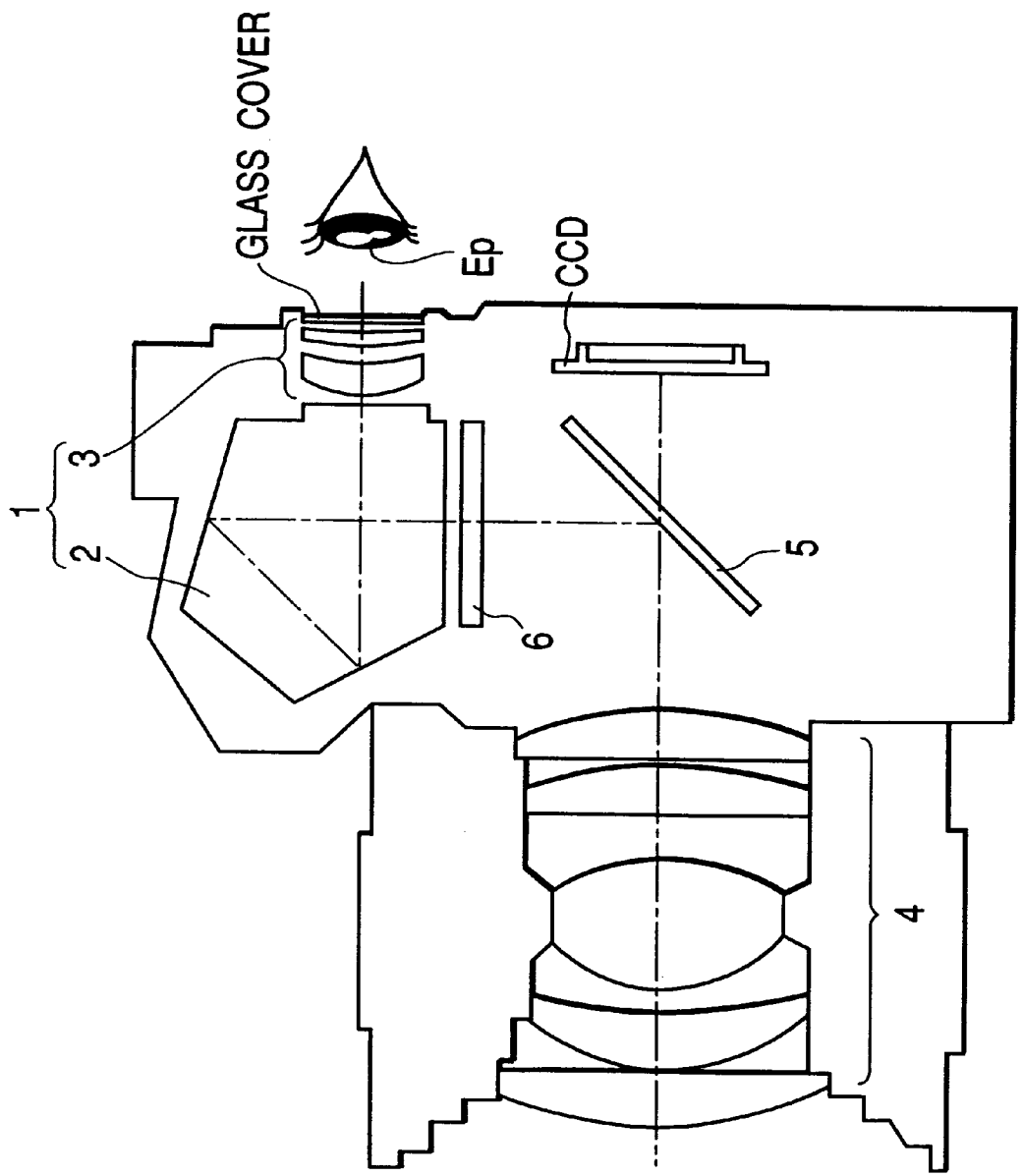
FIG. 2 is a view showing the case where the finder of the first embodiment is mounted to a single-lens reflex type digital camera.

FIG. 2 shows a single-lens reflex type digital camera in which the finder 1 is mounted. This camera is adapted to photograph in such a way that a light beam from an object, entering an imaging optical system 4, is imaged on a CCD (image sensor). Between the imaging optical system 4 and the CCD, an instant-return mirror 5 is removably mounted. When the instant-return mirror 5, as shown in the figure, is introduced into the optical path, the light beam from the object, passing through the imaging optical system 4, is reflected by the instant-return mirror 5 and then is imaged on a finder screen 6. In order to determine the picture composition of the object before photographing, an object image formed on the finder screen 6 is magnified by the finder 1 of the first embodiment and this magnified image is observed at the position of an eyepoint Ep. Specifically, the object image formed on the finder screen 6 is transmitted through the entrance surface 2a of the pentaprism 2, reflected by the reflecting surface 2b, and further reflected by the roof surface 2c to reach the exit surface 2c. The light beam transmitted through the exit surface 2d is introduced through the ocular optical system 3 to an observer's pupil.

The following are various numerical data relative to the finder of the first embodiment.

L/(np fE)=1.122
$L_2/L_1$=1.242
$\theta_1$=28.000
$(R_{31}+R_{32})/(R_{31}-R_{32})$=−2.705
$(R_{33}+R_{34})/(R_{33}-R_{34})$=8.953
$(fE/R_{32})-(fE/R_{33})$=−0.754
RP/fE=−13.093
H/V=0.75

Height of the image observed by the ocular optical system 3=5.00 (mm)

```
r₁ = ∞ (imaging plane)
    d₁ = 1.2963
r₂ = ∞ (transmitting surface)
    d₂ = 12.0700    nd₂ = 1.60311    vd₂ = 60.68
r₃ = ∞ (reflecting surface)
    d₃ = −12.5000   nd₃ = 1.60311    vd₃ = 60.68
r₄ = ∞ (reflecting surface)
    d₄ = 15.0000    nd₄ = 1.60311    vd₄ = 60.68
r₅ = −288.0113 (transmitting surface
    d₅ = 0.500
r₆ = 7.6141
    d₆ = 4.0000     nd₆ = 1.60311    vd₆ = 60.68
r₇ = 16.5480 (aspherical surface)
    d₇ = 1.8283
r₈ = 10.5578 (aspherical surface)
    d₈ = 1.2000     nd₈ = 1.80518    v₈ = 25.43
r₉ = 8.4362
    d₉ = 15.4907
r₁₀ = ∞ (eyepoint)
```

Conic constants and aspherical coefficients
Seventh surface
K=0
$A_4$=2.4415×10$^{-5}$, $A_6$=1.5628×10$^{-6}$,
$A_8$=0
Eighth surface
K=0
$A_4$=−3.2789×10$^{-4}$, $A_6$=−5.8462×10$^{-6}$,
$A_8$=0

Figure 3:
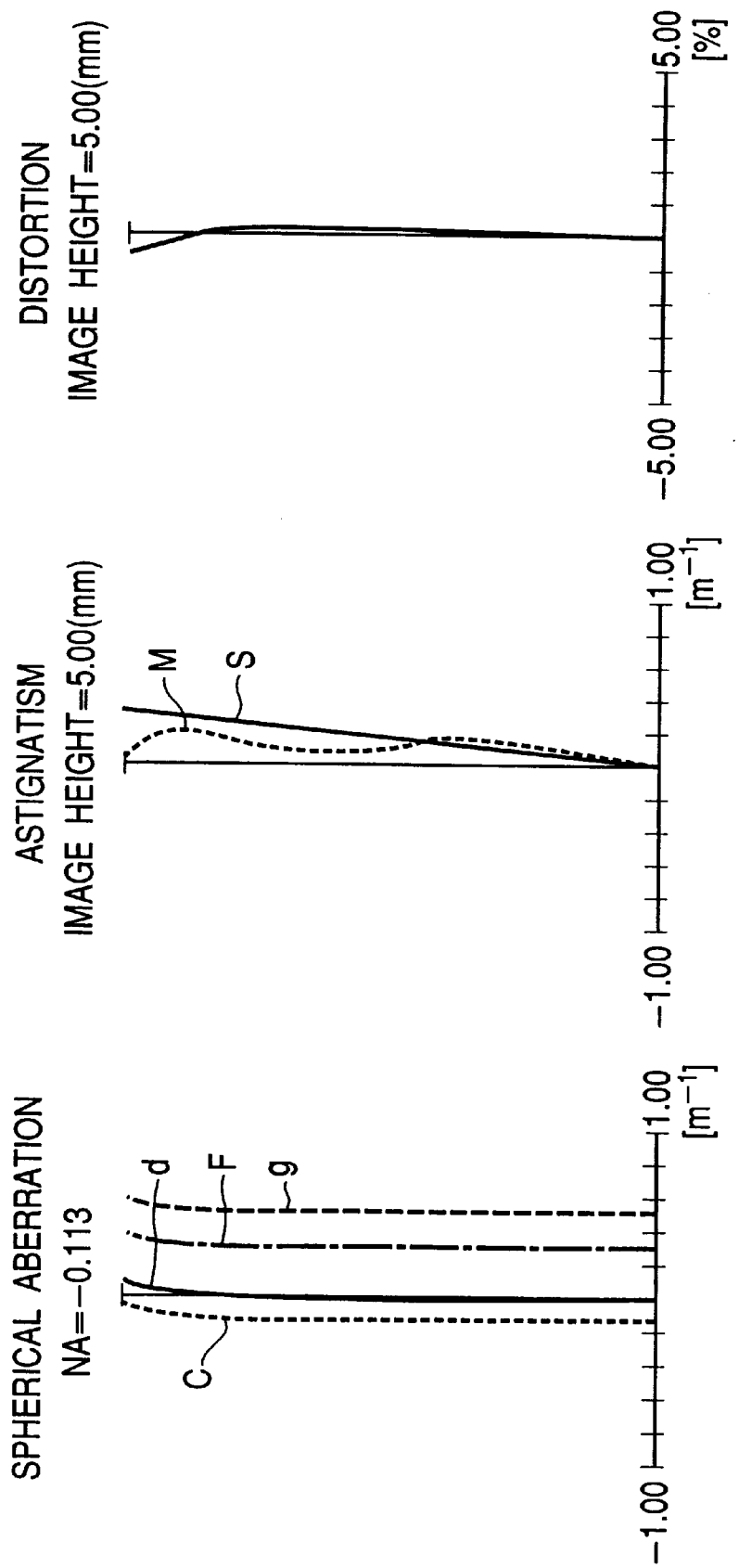
FIGS. 3A, 3B, and 3C are views showing aberration curves in the finder of the first embodiment.

FIGS. 3A, 3B, and 3C show aberration curves in the finder of the first embodiment.

Second Embodiment

The finder of this embodiment uses a Porro prism as an image erecting optical system. The arrangement of the finder of the second embodiment will be described below with reference to FIGS. 4–7.

Figure 4:
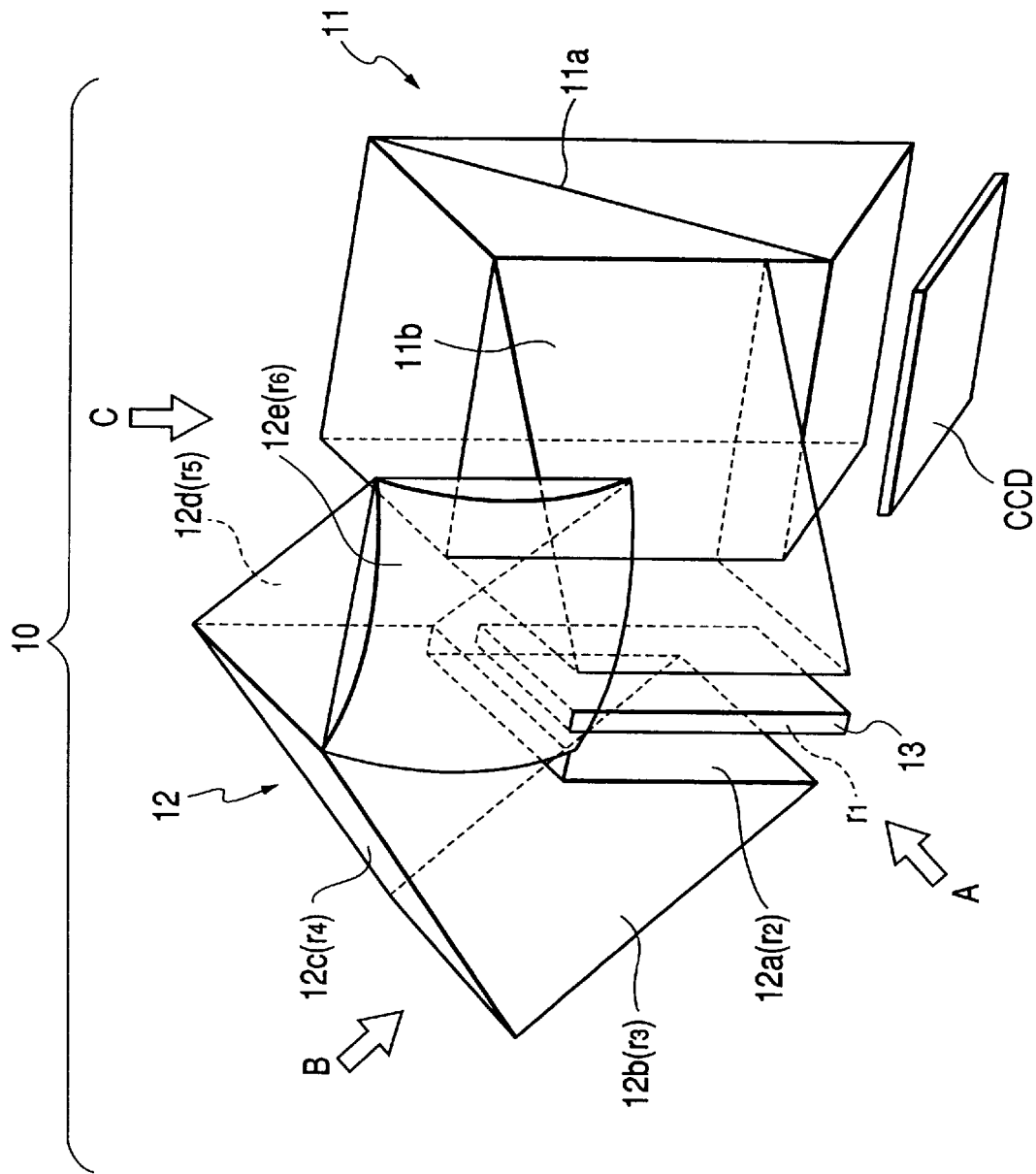
FIG. 4 is a perspective view showing the arrangement of prisms used in the finder of a second embodiment.
Figure 5:
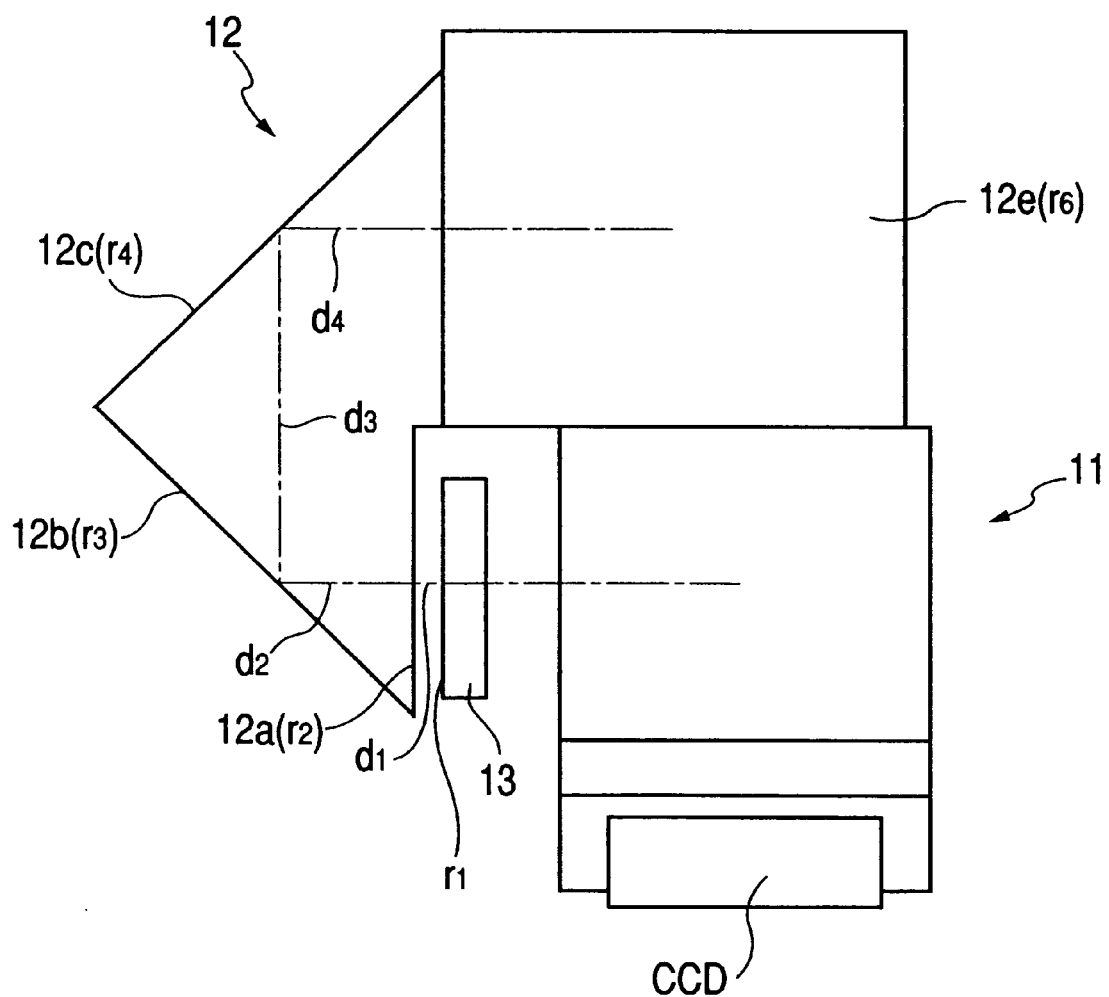
FIG. 5 is a sectional view, developed along the optical axis, showing the arrangement of the finder of the second embodiment, looking from the direction of an arrow A in FIG. 4.
Figure 6:
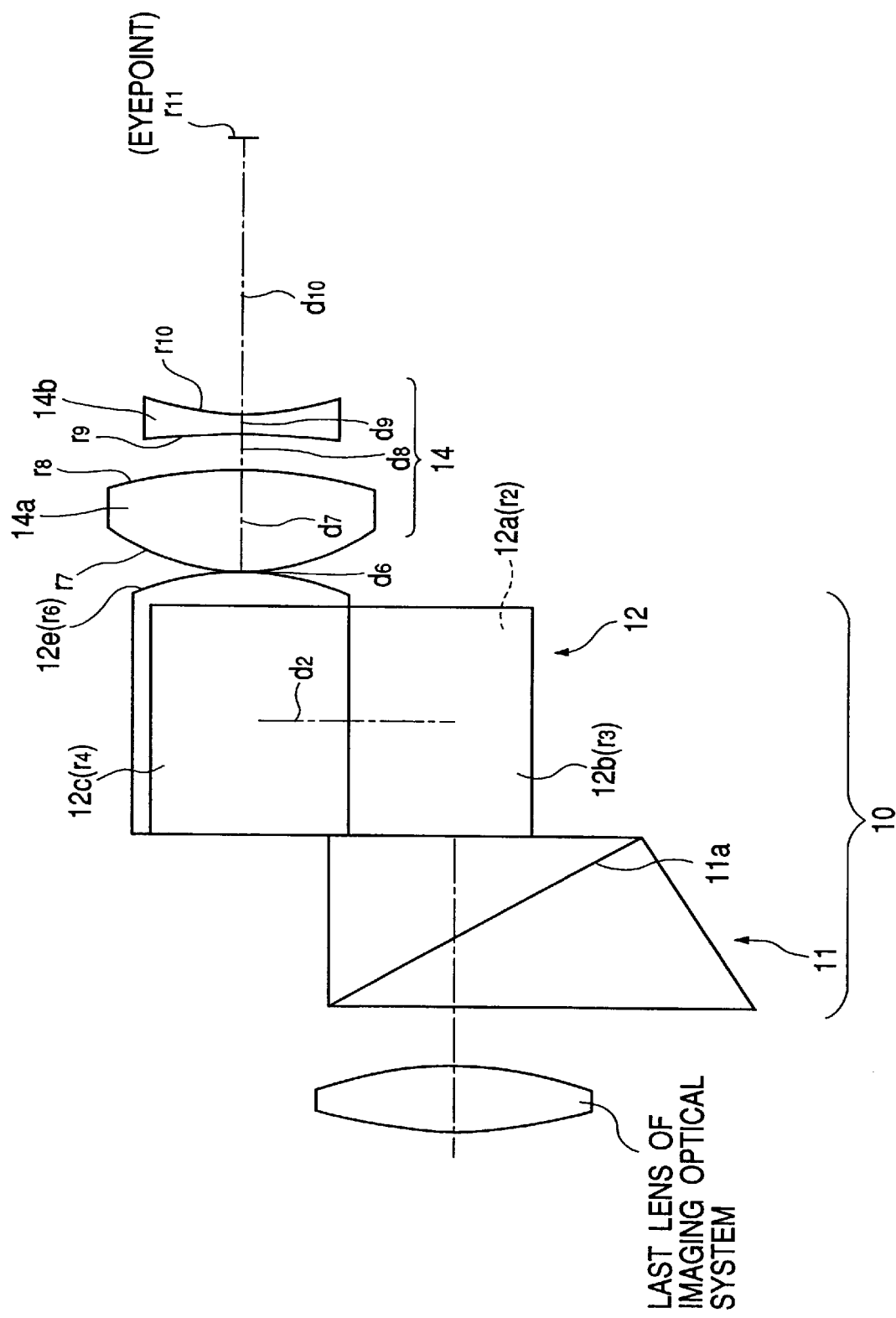
FIG. 6 is a sectional view, developed along the optical axis, showing the arrangement of the finder of the second embodiment, looking from the direction of an arrow B in FIG. 4.
Figure 7:
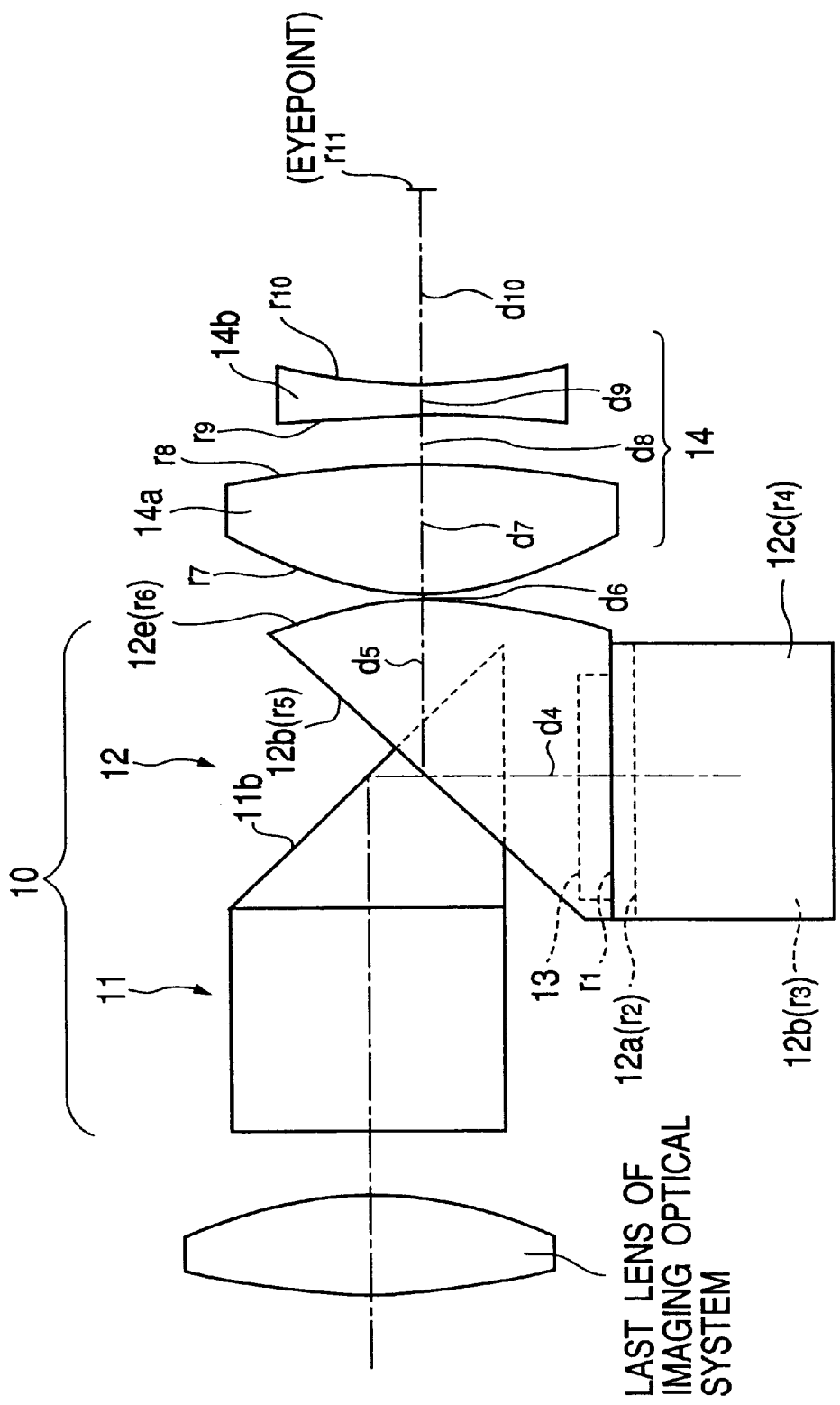
FIG. 7 is a sectional view, developed along the optical axis, showing the arrangement of the finder of the second embodiment, looking from the direction of an arrow C in FIG. 4.

As shown in FIG. 4, a Porro prism 10 used in the finder of the second embodiment is constructed with a first prism 11 and a second prism 12. A finder screen 13 is interposed between the first prism 11 and the second prism 12. The finder of the second embodiment including these prisms is also mounted in the single-lens reflex type digital camera such as that shown in FIG. 2. In this case, the CCD (image sensor) is placed below the first prism 11.

When the finder of the second embodiment is used in the digital camera, a light beam from the imaging optical system of the camera, after entering the first prism 11, is split into two beams for a photographing optical path and a finder optical path by a half mirror 11a. The light beam from the imaging optical system to be introduced into the photographing optical path is reflected by the half mirror 11a and reaches the CCD. On the other hand, the light beam from the imaging optical system to be introduced into the finder optical path is transmitted through the half mirror 11a and then is reflected by a reflecting surface 11b to reach the finder screen 13. An object image produced by the imaging optical system is formed on the finder screen 13. Subsequently, the light beam forming the object image, after being incident on the second prism 12 from an entrance surface 12a thereof, is reflected in turn by a first reflecting surface 12b, a second reflecting surface 12c, and a third reflecting surface 12d and reaches an exit surface 12e. After that, the light beam emerges from the exit surface 12e and is conducted to the observer's pupil through an ocular optical system 14 shown in FIGS. 6 and 7. Also, in FIGS. 6 and 7, the entrance surface 12a is blocked by the first reflecting surface 12b, and the first reflecting surface 12b by the second reflecting surface 12c, respectively.

In the second prism 12 of the finder of the second embodiment, the normal lines of the first and second reflecting surfaces 12b and 12c are included in the same plane, which is nearly perpendicular to the optical axis of the imaging optical system. In addition, the normal lines of the first and second reflecting surfaces 12b and 12c are nearly perpendicular to each other, and an axial light beam introduced from the imaging optical system is reflected by the third reflecting surface 12d so as to be practically parallel with the optical axis of the imaging optical system.

In the finder of the second embodiment, the ocular optical system 14 includes, in order from the side of the second prism 12, a positive biconvex lens 14a whose surface with relatively large curvature is directed toward the second prism 12 and a negative biconcave lens 14b whose surface with relatively large curvature is directed toward the pupil. The positive lens 14a and the negative lens 14b are moved along the optical axis, thereby making the diopter adjustment.

The following are various numerical data relative to the finder of the second embodiment.

L/(np fE)=1.102

$(R_{31}+R_{32})/(R_{31}-R_{32})$=−0.296

$(R_{33}+R_{34})/(R_{33}-R_{34})$=0.338

$(fE/R_{32})-(fE/R_{33})$=−0.353

RP/fE=−1.203

H/V=0.75

$l_2/l_1$=1.118

Height of the image observed by the ocular optical system 14=5.00 (mm)

$r_1 = \infty$ (imaging plane)
    $d_1$ = −1.0017
$r_2 = \infty$ (transmitting surface)
    $d_2$ = −4.4000    $nd_2$ = 1.52540    $vd_2$ = 56.25
$r_3 = \infty$ (reflecting surface)
    $d_3$ = −11.9000    $nd_3$ = 1.52540    $vd_3$ = 56.25
$r_4 = \infty$ (reflecting surface)
    $d_4$ = 13.3000    $nd_4$ = 1.52540    $vd_4$ = 56.25
$r_5 = -\infty$ (reflecting surface)
    $d_5$ = 8.400    $nd_5$ = 1.52540    $vd_5$ = 56.25
$r_6$ = −27.1980 (transmitting surface)
    $d_6$ = 0.3000

-continued $r_7$ = 14.9070
    $d_7$ = 1.8283    $nd_7$ = 1.49241    $vd_7$ = 57.66
$r_8$ = −27.4380 (aspherical surface)
    $d_8$ = 2.3000
$r_9$ = −48.0090 (aspherical surface)
    $d_9$ = 1.3000    $nd_9$ = 1.58423    $vd_9$ = 30.49
$r_{10}$ = 23.7540
    $d_{10}$ = 15.5000
$r_{11} = \infty$ (eyepoint)

Conic constants and aspherical coefficients
Eighth surface
K=0
$A_4$=1.0531×10$^{-4}$, $A_6$=−7.7711×10$^{-7}$,
$A_8$=4.5344×10$^{-9}$
Ninth surface
K=0
$A_4$=5.1686×10$^{-5}$, $A_6$=−7.8733×10$^{-7}$,
$A_8$=4.1723×10$^{-9}$ FIGS. 8A, 8B, and 8C show aberration curves in the finder of the second embodiment.

In the numerical data shown in the above embodiments, $r_1$, $r_2$, . . . represent radii of curvature of the surfaces of individual optical elements such as lenses; $d_1$, $d_2$, . . . represent thicknesses of individual optical elements, or spaces therebetween; $nd_1$, $nd_2$, . . . represent refractive indices of individual optical elements at the d line (567.56 nm); and $vd_1$, $vd_2$, . . . represent Abbe's numbers of individual optical elements at the d line. Also, when X is taken as the coordinate in the direction of the optical axis, Y is taken as the coordinate in the direction normal to the optical axis, K denotes a conic constant, and $A_4$, $A_6$, and $A_8$ denote aspherical coefficients, configuration of each of the aspherical surfaces in the embodiments is expressed by the following equation:

$$X = \frac{Y^2/r}{1+\sqrt{1-(1+K)(Y/r)^2}} + A_4Y^4 + A_6Y^6 + A_8Y^8$$

What is claimed is:

1. A finder for single-lens reflex type digital cameras, comprising:
   a reflecting plane constructed and arranged to split a light beam from an imaging optical system of a camera into two beams directed toward an image sensor and a finder system;
   an image-erecting prism system; and
   an ocular optical system,
   wherein said image-erecting prism system and said ocular optical system are arranged along a traveling direction of light in said finder system placed after a position of the image formed by said imaging optical system,
   wherein said prism system comprises, in order along the traveling direction of the light in one prism block, an entrance surface, a first reflecting surface consisting of one plane face, a second reflecting surface of roof shape, and an exit surface,
   wherein said first reflecting surface folds an optical path toward an opposite side of said ocular optical system in reference to said exit surface, and
   wherein the optical path between said entrance surface and said first reflecting surface intersects, inside the prism block, an optical path between said second reflecting surface and said exit surface.

2. A finder according to claim 1, wherein said finder satisfies the following conditions:

$$0.8 < L/(np \cdot fE) < 1.6$$

$$0.8 < L_2/L_1 < 2.0$$

$$20 < \theta_1 < 35$$

where L is an axial distance from said entrance surface to said exit surface of said prism system, np is a refractive index of a medium of said prism system, fE is a combined focal length of said finder system on a pupil side of a position of the image formed by said imaging optical system, $L_1$ is an axial distance from said entrance surface to said first reflecting surface of said prism system, $L_2$ is an axial distance from said second reflecting surface to said exit surface of said prism system, and $\theta_1$ is an angle made by an optical axis from said entrance surface to said first reflecting surface, of said prism system with a normal line to said first reflecting surface.

3. A finder according to claim 1, wherein said ocular optical system includes, in order from an object side, a positive lens having an object-side surface that is convex toward the object side and a negative lens having a pupil-side surface that is concave toward a pupil side, and satisfies the following conditions:

$$-6 < (R_{31} + R_{32})/(R_{31} - R_{32}) < -0.1$$

$$0.1 < (R_{33} + R_{34})/(R_{33} - R_{34}) < 15$$

where $R_{31}$ and $R_{32}$ are radii of curvature of the object-side surface and a pupil-side surface, respectively, of said positive lens and $R_{33}$ and $R_{34}$ are radii of curvature of an object-side surface and the pupil-side surface, respectively, of said negative lens.

4. A finder according to claim 3, wherein said ocular optical system has aspherical surfaces and is constructed so that said negative lens is movable for diopter adjustment, said ocular optical system further satisfying the following condition:

$$-1.2 < (fE/R_{32}) - (fE/R_{33}) < 1.2$$

where fE is a combined focal length of said finder system on a pupil side of a position of the image formed by said imaging optical system.

5. A finder according to claim 4, wherein said prism system for erecting an image is constructed so that said exit surface thereof is shaped into a curved surface which is convex toward the pupil side and satisfies the following condition:

$$-20 < RP/fE < -0.7$$

where RP is a radius of curvature of the exit surface of said prism system for erecting the image.

6. A finder according to claim 1, wherein said finder system is placed on a transmission side of said reflecting plane for splitting a light beam from said imaging optical system.

7. A finder according to claim 1, wherein said finder satisfies the following condition:

$$0.72 < H/V < 1$$

where H is a longitudinal dimension of a finder field and V is a lateral dimension of the finder field.

8. A finder for single-lens reflex type digital cameras, comprising:

a reflecting plane for splitting a light beam from an imaging optical system of a camera into two beams directed toward an image sensor and a finder system;

a prism; and an ocular optical system, wherein said prism and said ocular optical system are arranged along a traveling direction of light in said finder system placed after a position of the image formed by said imaging optical system, wherein said prism comprises, in order along the traveling direction of the light, a first reflecting surface, a second reflecting surface, and a third reflecting surface, wherein a normal line to said first reflecting surface and a normal line to said second reflecting surface lie in a plane and intersect one another, wherein said plane intersects an optical axis of said imaging optical system, wherein an axial light beam from said imaging optical system is reflected by said third reflecting surface, to be substantially parallel with the optical axis of said imaging optical system, wherein said ocular optical system includes, in order from an object side, an object side surface of a biconvex lens that has a larger absolute value of curvature than an absolute value of curvature of a pupil-side surface thereof and a pupil side surface of a biconcave lens that has a larger absolute value of curvature than an absolute value of curvature of an object-side surface thereof, and wherein said finder satisfies the following conditions:

$$1 < l_2/l_1 < 1.4$$

$$0.8 < L/L(np \cdot fE) < 1.6$$

where $l_1$ is an axial distance from said first reflecting surface to said second reflecting surface of said prism, $l_2$ is an axial distance from said second reflecting surface to said third reflecting surface of said prism, L is an axial distance from an entrance surface to an exit surface of said prism, np is a refractive index of a medium of said prism, and fE is a combined focal length of said finder system on a pupil side of a position of the image formed by said imaging optical system.

9. A finder according to claim 8, wherein said ocular optical system has aspherical surfaces and is constructed so that said biconcave lens is movable for diopter adjustment, said ocular optical system further satisfying the following condition:

$$-1.2 < (fE/R_{32}) - (fE/R_{33}) < 1.2$$

where fE is a combined focal length of said finder system on a pupil side of a position of the image formed by said imaging optical system, $R_{32}$ is a radius of curvature of the pupil-side surface of said biconvex lens, and $R_{33}$ is a radius of curvature of the object-side surface of said biconcave lens.

10. A finder according to claim 9, wherein said prism is constructed so that said exit surface thereof is shaped into a curved surface which is convex toward the pupil side and satisfies the following condition:

$$-20 < RP/fE < -0.7$$

where RP is a radius of curvature of the exit surface of said prism.

11. A finder according to claim 8, wherein said finder system is placed on a transmission side of said reflecting plane for splitting a light beam from said imaging optical system.

12. A finder according to claim 8, wherein said reflecting plane for splitting a light beam from said imaging optical system is constructed with a half mirror, said half mirror reflecting the light beam toward said image sensor and transmitting the light beam toward said finder system, and a reflecting surface is interposed between said half mirror and said position of the image formed by said imaging optical system.

13. A finder according to claim 8, wherein said finder satisfies the following condition:

$0.72 < H/V < 1$ where H is a longitudinal dimension of a finder field and V is a lateral dimension of the finder field.

14. A finder for single-lens reflex type digital cameras, comprising:

a reflecting plane for splitting a light beam from an imaging optical system of a camera into two beams directed toward an image sensor and a finder system;

an image-erecting prism system; and an ocular optical system, wherein said prism system and said ocular optical system are arranged along a traveling direction of light in said finder system placed after a position of the image formed by said imaging optical system, wherein said ocular optical system includes, in order from an object side, an object side surface of a positive lens which is convex toward the object side and a pupil side surface of a negative lens which is concave toward the pupil side, and wherein said finder satisfies the following conditions:

$-6 < (R_{31}+R_{32})/(R_{31}-R_{32}) < -0.1$ $0.1 < (R_{33}+R_{34})/(R_{33}-R_{34}) < 15$ where $R_{31}$ and $R_{32}$ are radii of curvature of the object-side surface and the pupil-side surface, respectively, of said positive lens and $R_{33}$ and $R_{34}$ are radii of curvature of the object-side surface and the pupil-side surface, respectively, of said negative lens.

15. A finder according to claim 14, wherein said ocular optical system has aspherical surfaces and is constructed so that said negative lens is movable for diopter adjustment, said ocular optical system further satisfying the following condition:

$-1.2 < (fE/R_{32}) - (fE/R_{33}) < 1.2$ where fE is a combined focal length of said finder system on a pupil side of a position of the image formed by said imaging optical system.

16. A finder according to claim 15, wherein said image-erecting prism system is constructed so that an exit surface thereof is shaped into a curved surface which is convex toward the pupil side and satisfies the following condition:

$-20 < RP/fE < -0.7$ where RP is a radius of curvature of the exit surface said image-erecting prism system.

17. A finder according to claim 14, wherein said finder system is placed on a transmission side of said reflecting plane for splitting a light beam from said imaging optical system.

18. A finder according to claim 14, wherein said finder satisfies the following condition:

$0.72 < H/V < 1$ where H is a longitudinal dimension of a finder field and V is a lateral dimension of the finder field.

* * * * *